May 20, 1952  W. R. McKAY ET AL  2,597,121
OFFSET DISK HARROW

Filed June 14, 1944  4 Sheets-Sheet 2

INVENTORS
WILLIAM R. MCKAY
ROLLIE H. MITCHELL
ATTORNEYS

WITNESS

Patented May 20, 1952

2,597,121

UNITED STATES PATENT OFFICE 2,597,121

OFFSET DISK HARROW

William R. McKay, Compton, and Rollie H. Mitchell, Huntington Park, Calif., assignors to John Deere Killefer Company, a corporation of California Application June 14, 1944, Serial No. 540,340

14 Claims. (Cl. 55—73)

The present invention relates generally to ground working implements, with particular reference to offset disk harrows of the type in which the front and rear gangs are rigidly fixed in angled position in a unitary frame and are transported on vertically shiftable carrying wheels mounted on the implement frame.

The principal object of the present invention relates to the provision of a novel and improved offset disk harrow, which is of simplified construction but is strong and durable, and efficient in operation.

Another object relates to the provision of an improved lifting arrangement for raising the harrow upon the transport wheels, which lifting mechanism is more convenient and easier to operate than those heretofore known to those skilled in the art. In the accomplishment of this object, the wheels are mounted on crank axles swingably connected to the harrow frame at opposite sides thereof, one of the wheel axles extending forwardly and the other rearwardly from a pair of rockshafts journaled on the frame. Each of the rockshafts is provided with a lifting arm which is connected to a threaded lifting mechanism adjustable by means of a manually operated crank. The two cranks for the two lifting screw devices are mounted side by side on the rear end of the harrow frame, permitting either simultaneous or independent adjustment to raise and lower the harrow frame, and since one of the wheel supporting crank axles swings downwardly and rearwardly and the other swings downwardly and forwardly, the frame is maintained in proper balance in all positions of the carrying wheels. In order to further facilitate lifting the harrow frame, counterbalancing springs are connected to suitable arms on the rockshaft and extend forwardly and rearwardly therefrom, respectively, and are anchored to the front and rear gangs, respectively.

Still another object relates to the provision of novel and improved means responsive to the turning of the tractor or other draft vehicle in one direction, for facilitating the turn in that direction. A disk harrow of the offset type can be turned easily in the direction of convergence of the axes of the gangs, which is usually toward the left of the implement. It is very difficult, however, to make a turn in the opposite direction, with the disk gangs in ground working position. Although it is possible to raise the frame upon the transport wheels before making a right turn, this operation requires considerable time to accomplish manually, and while there are harrows of this type known to the art, which are provided with power operated mechanism for raising the frame upon the transport wheels for the purpose of negotiating a right turn, this mechanism is rather costly and complicated. It has been found, however, that if either the front gang or the rear gang is raised out of ground working position, the harrow will follow the tractor in a turn away from the direction of convergence of the gangs, and the effort necessary to raise one end of the harrow is much less than that required to raise the entire harrow out of ground working position. Accordingly, another object of our invention relates to the provision of novel and improved means, responsive to the turning of the tractor, to raise one end of the harrow to facilitate making a right turn.

Still another more specific object relates to the provision of a caster wheel mounted on the rear end of the harrow frame by means providing for vertical shifting movement of the caster wheel relative to the harrow frame, and connected to the tractor so that a turn of the latter to the right raises the rear end of the frame on the caster wheel and permits the harrow to roll on the front gang of disks through the right turn, automatically returning to full ground working position after the turn has been negotiated.

Still another object of our invention has to do with the provision of means responsive to the turning of the tractor in the direction opposite to the direction of convergence of the axes of the disk gangs, for raising the front end of the harrow frame to lift the front gang of disks out of ground working position to permit the harrow to roll on the rear disk gang through the right turn. In the accomplishment of this object, the implement frame and the hitch member, which is normally vertically swingable relative thereto, are angled upwardly so that the front end of the harrow frame is supported through the hitch member on the tractor. A still further object relates to the provision for using the front gang lifting mechanism for angularly fixing the hitch member relative to the harrow frame for purposes of transport, whereby the harrow frame is supported on the pair of transport wheels and also carried at its front end through the hitch member on the drawbar of the tractor.

A further object relates to the provision of means for adjustably aligning the wheels in the direction of travel of the harrow, to compensate for a slight change in the angular relation between the frame and the direction of advance which is caused by shifting the hitch device laterally when adjusting the amount of offset to the right or left of the center line of the tractor.

These and other objects and advantages of our invention will be apparent to those skilled in the art after a consideration of the following description, in which reference is had to the drawings appended hereto, in which:

Referring now to the drawings and more particularly to Figures 1–5, inclusive, the harrow comprises a front gang of disks 12 and a rear gang of disks 13, each gang being journaled in a gang frame 14 comprising a pair of fore and aft spaced transversely extending frame members 15, 16 interconnected by a fore and aft extending frame member 17 at each end thereof. The two gangs of disks 12, 13 are disposed in permanently angled position with the axes of the two gangs disposed substantially in a common horizontal plane and angled with the point of convergence to the left of the harrow. The front gang of disks is positioned to throw the soil to the right and the rear gang of disks is oppositely positioned to throw the soil to the left, in a conventional manner. The two gang frames 14 are rigidly interconnected in this position, by means of a plurality of generally fore and aft extending interconnecting frame members 18, 19, 20, which are rigidly bolted or otherwise fixed to the front and rear frame members 15, 16 of each of the two gang frames 14. Thus, the two gangs 12, 13 are journaled in a permanently angled position in a rigid unitary frame, which is provided with downwardly extending legs 21, which are attached to the gang bolts 22 in a manner well-known to those skilled in the art.

Figure 1:
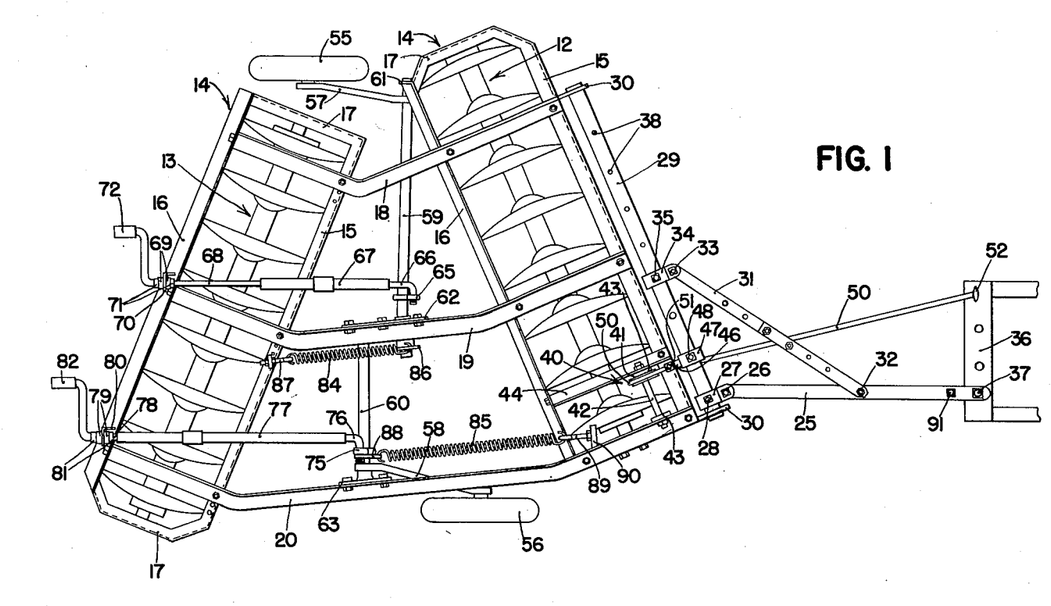
Figure 1 is a plan view of an offset disk harrow embodying the principles of our invention, shown in ground working position.

Draft is applied to the harrow through a hitch member including a longitudinally extending hitch bar 25 connected through a pivot bolt 26 to a clamping member 27, which is fixed by a bolt 28 to a transversely disposed pipe member 29. The pipe member 29 is journaled in a pair of forwardly extending brackets 30 attached to the forward ends of the two outer longitudinal frame members 18, 20, respectively. The hitch bar 25 is braced against lateral swinging movement by means of an extensible brace member 31 bolted to the bar 25 and the intermediate portion of the latter by a bolt 32 and connected by a pivot bolt 33 to a clamp 34 which is rigidly fixed to the transverse pipe member 29 by a bolt 35. Thus, it is evident that normally the hitch bar 25 is swingable vertically together with the brace 31 and the pipe member 29, about the generally transverse axis of the latter. This action is necessary during operation, to permit the front and rear gangs of the harrow to follow the ground regardless of relative vertical movement of the tractor or draft vehicle. The tractor is indicated in the drawings by a transverse draft frame 36, to which the forward end of the hitch bar 25 is pivotally connected by means of a vertically disposed draft pin or bolt 37, about which the harrow is free to swing in a manner well-known to those skilled in the art. The amount of offset to the left or to the right of the center line of the tractor is adjustable by lengthening or shortening the extensible brace 31, to change the angle of the bar 25 to the pipe member 29, and furthermore the hitch member can be shifted laterally along the pipe member 29 by removing the bolts 28 and 35 and shifting the clamps 27 and 34, replacing the bolts in any of a number of apertures 38 provided in the pipe member 29 for that purpose.

Figures 5, 7:
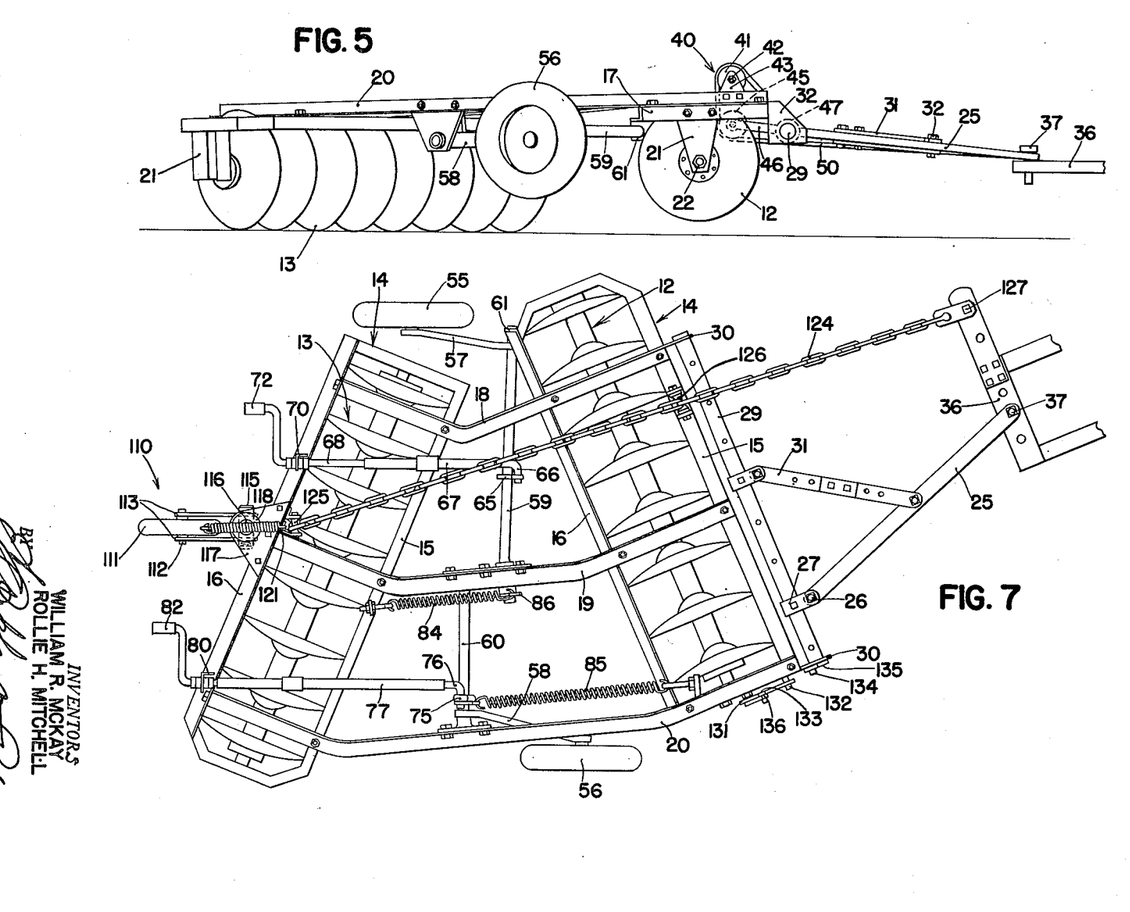
Figure 5 is a side elevational view of the harrow shown in a position with the front gang lifted from the ground for purposes of making a right turn.
Figure 7 is a plan view showing a modification of our invention in which the rear end of the frame is raised on a caster wheel for purposes of making a right turn.

It is evident, that when the tractor makes a turn to the left, the horrow will follow easily, since the convergence of the front and rear disk gangs is toward the left. It is also evident that with the harrow in full ground working position, it would be very difficult to negotiate a turn to the right, for it would be necessary to drag the front gang of disks in a direction substantially parallel to its axis. Therefore, with this type of harrow, it is necessary to raise one or both of the disk gangs out of ground working position in order to make a turn to the right. In this embodiment of the present invention, the front gang is lifted responsive to a turning of the tractor to the right, by means of a block and tackle mechanism indicated in its entirety by reference numeral 40. Referring more particularly to Figures 1 and 5, a sheave 41 is mounted on a shaft 42, which is journaled in a pair of brackets 43 which are bolted to the forward end of one of the longitudinal frame members 20 and to a frame member 44 extending across the front gang frame 14, respectively. A lower sheave 45 is journaled at the end of a rearwardly extending arm 46, which is fixed to a sleeve 47 on the transverse pipe member 29. The clamping sleeve 47 is secured to the pipe member 29 by means of a bolt 48 extending vertically through one of the apertures 38, thereby fixing the arm 46 on the pipe 29, and causing it to swing about the axis of the latter together with the hitch device. The two sheaves 41, 45 are disposed in substantially vertical alignment and a flexible cable 50 is anchored by means of a fitting 51 to the front transverse frame member 15 of the front disk gang 14. The cable 50 is trained upwardly and rearwardly over the upper sheave 41, from which it passes downwardly and forwardly under the lower sheave 45. The forward end of the cable 50 is securely attached by means of a suitable fitting 52 to the draft frame 36 of the tractor in laterally offset relation toward the left from the pivot connection 37 of the draft bar 25.

When the tractor makes a right turn, the draft frame 36 swings in a clockwise direction relative to the draft bar 25 as viewed in Figure 1, about the vertical axis of the draft bolts 37, and the left end of the draft frame 36, in swinging forwardly, exerts a force in tension upon the cable 50, pulling the latter forwardly. This tends to draw the two sheaves 41, 45 together, and since the end of the cable 50 is anchored to the harrow frame, the effect of this action is to raise the lower sheave 45, swinging the arm 46 together with the pipe member 29 and hitch bar 25 in a clockwise direction as viewed in Figure 5 relative to the frame of the harrow. Inasmuch as the forward end of the hitch device is supported on the tractor draft frame 36, this angular movement of the draft device and harrow frame raises the entire front gang 12 from the ground, leaving the harrow supported on the tractor draft frame 36 at its forward end and on the disks of the rear gang 13 at its rear end. The rear gang disks are inclined toward the right, making it easy to negotiate the right turn, without interference from the front gang 12. As soon as the tractor is straightened once more, the cable 50 is relaxed, allowing the front end of the harrow to be lowered to the ground, after which the ground working operation continues in a normal manner. Thus, it is evident that the right turn can be made without attention of the tractor operator, since the lifting mechanism 40 operates entirely automatically.

When the harrow is transported from one field to another, it is raised out of ground working position upon a pair of laterally spaced transport wheels 55, 56, by means which will now be described. Each of the wheels 55, 56 is journaled at the end of a crank axle 57, 58, respectively, which are mounted on a pair of transversely disposed rockshafts 59, 60, respectively. The rockshaft 59 is journaled at its left end in a bracket 61, which is fixed to the rear frame member 16 of the front gang frame. The right end of the rockshaft 59 is journaled in a bracket 62 which is mounted on the center frame member 19. The other rockshaft 60 is journaled in a bearing mounted on the bracket 62 at its left end and in a second bracket 63 fixed to the right hand longitudinal frame member 20. The axes of the two rockshafts 59, 60 are disposed between the front and rear gangs and are substantially parallel to each other and spaced closely together although not necessarily in transverse alignment with each other. The crank axle 57 is fixed to the rockshaft 59 in such a manner that it extends rearwardly therefrom, while the other crank axle 58 extends forwardly from the rockshaft 60. Thus, when the two rockshafts are rocked to swing the axles 57, 58 downwardly to raise the harrow frame on the two transport wheels 55, 56, they are swung in opposite directions and thus do not tend to unbalance the harrow frame as the latter is raised upon the wheels. Furthermore, there is no tendency to push the harrow forwardly or rearwardly by the downward swinging movement of the crank axles.

The crank axle 59 is rocked through an arm 65 which is rigidly fixed to the rockshaft and extends upwardly therefrom. A rod 66 has one end bent to form a hook which engages a suitable aperture in the end of the arm 65, the rear end of the rod 66 being rigidly fixed to a sleeve member 67, the interior of which is provided with suitable threads adapted to engage a threaded shaft 68, which is telescopically related to the sleeve 67. The rear end of the shaft 68 is mounted in thrust bearings 69 which are supported in a bracket 70 extending upwardly from the rear frame member 16 of the rear gang frame 14. Stop collars 71 are fixed to the shaft 68 on both sides of the thrust bearings 69, whereby the shaft 68 is prevented from shifting fore and aft relative to the harrow frame, but is permitted to be rotated by means of a manually actuable handle 72 at the rear end of the shaft 68 behind the bracket 70. Thus, by turning the handle or crank 72, the threaded shaft 68 is rotated within the threaded sleeve 67, causing the latter to shift forwardly and rearwardly and thereby swinging the arm 65, together with the rockshaft 59 and crank axle 57 about the axis of the rockshaft 59. By turning the handle 72 in one direction the sleeve 67 is moved rearwardly, swinging the crank axle 57 downwardly to raise the harrow frame upon the transport wheel 55, while turning the handle in the opposite direction raises the crank axle and lowers the harrow frame.

Likewise, the rockshaft 60 is provided with an arm 75 to which is swingably connected a rod 76 having a threaded sleeve 77 attached to the rear end thereof, within which is telescopically disposed a threaded shaft 78, mounted in a pair of thrust bearings 79 in a bracket 80 mounted on the rear transverse member 16 of the rear gang frame 14. A pair of stop collars 81 are fixed to the shaft 78 on opposite sides of the thrust bearings 79 and the rear end of the shaft 78 is provided with a crank 82, which is disposed adjacent the other crank 72 and can be operated either simultaneously therewith or independently thereof. In this manner, the harrow frame can be raised by turning both cranks 72, 82, and when it is raised to transport position it can be leveled by turning one or the other of the cranks independently. Obviously, to raise the right side of the harrow, the crank must be turned in the direction to shift the sleeve 77 forwardly in order to swing the crank axle 58 downwardly and rearwardly.

Figure 2:
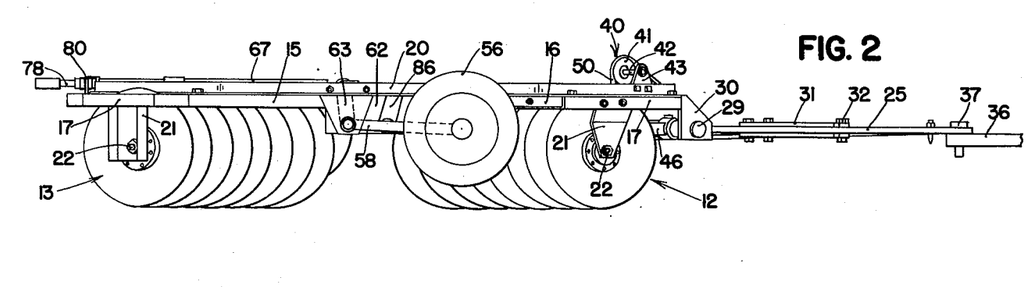
Figure 2 is a side elevational view of the harrow shown in Figure 1.
Figure 3:
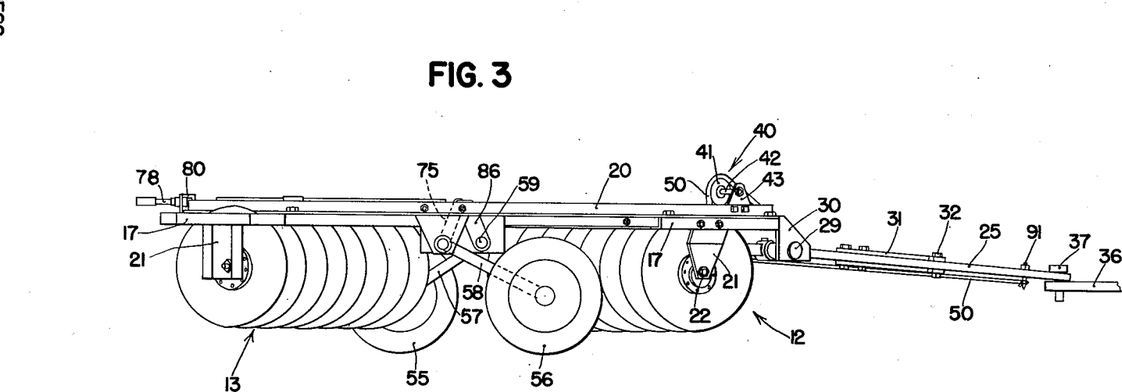
Figure 3 is a side elevational view of the harrow raised into transport position.

A pair of counterbalancing springs 84, 85 is provided for facilitating the raising of the harrow frame upon the transport wheels. The spring 84 is connected to an arm 86 fixed to the inner end of the rockshaft 59 and extending rearwardly therefrom to an anchor bolt 87 attached to the front transverse frame member 15 of the rear gang member 14. The spring 85 is connected to a short strap member 88 which is apertured to receive the end of the rod 76, adjacent the actuating arm 75. The spring 85 extends forwardly therefrom and is connected to an anchor bolt 89 which is secured to a lug 90 fixed to the outer frame member 20. Both of the springs 84, 85 are of the helical type and are stressed in tension to exert a force upon the rockshafts tending to swing the wheels downwardly to raise the harrow frame. Obviously, by properly adjusting the tension of the springs 84, 85 the operation of raising the harrow to transport position can be accomplished very easily by an operator standing behind the harrow. Inasmuch as the screw mechanism is non-reversible in action, the wheels will maintain any position in which they are left. In Figure 2 the wheels are shown in the completely raised position above the ground level, in which position the weight of the wheels is added to the harrow frame to increase the penetration of the disks. In Figure 3 the wheels are shown in the transport position. If the wheels are left in any intermediate position, they will serve as gauge wheels and will limit in some degree the amount of penetration of the disks.

When the harrow is being transported, it is advisable to angularly fix the hitch bar 25 relative to the harrow frame in order to provide three points of support and thus make the implement more stable during transport. This can be accomplished by means of the block and tackle mechanism 40 and is made effective by disconnecting the cable 50 from its connection 52 on the tractor draft frame 36 and reconnecting the cable 50 to an anchor bolt 91 attached to the draft bar 25 behind the draft pin 37. The cable 50 is, of course, pulled tight in order to restrain angular movement between the hitch device and the harrow frame.

Figure 4:
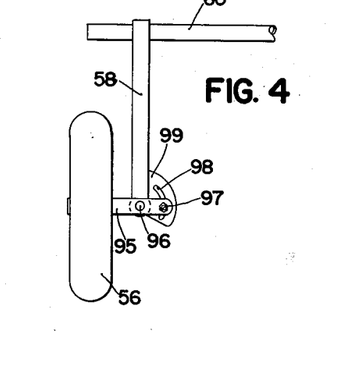
Figure 4 is a fragmentary front elevational view of one of the transport wheels, showing the means for adjusting the alignment of the wheel, drawn to an enlarged scale.

As mentioned above, the amount of offset of the harrow is controlled by shifting the point of draft laterally relative to the harrow frame. However, adjustment of this point of draft also results in a variation in the angular relation between the harrow frame and the direction of travel. Hence, the rockshafts 59 and 60 are disposed perpendicular to the direction of travel in only one adjustment of the hitch device and therefore the wheels 55, 56 are thrown slightly out of line in other positions of the hitch member. Although the effect of this misalignment of the wheels with respect to the direction of travel during ground working operation is negligible, and can be ignored, we have shown in Figure 4 how the wheels can be mounted to provide an adjustment thereof so that they can be set in fore and aft extending planes in any working position of the harrow. Referring to Figure 4, the wheel 56 is journaled on an axle 95 which is pivotally connected to the end of the crank axle arm 58 by means of a pivot pin 96. The axle 95 is extended inwardly from the crank arm 58 and is provided with a clamping bolt 97 which extends through an arcuate slot 98, which is provided in a sector 99 rigidly fixed to the lower end of the arm 58. The slot 98 is curved in a circular arc about the center of the pivot bolt 96, so that the axle 95 after being angularly adjusted relative to the arm 58 to place the wheel in a fore and aft extending plane, can be rigidly secured in adjusted position by tightening the bolt 97.

Figure 6:
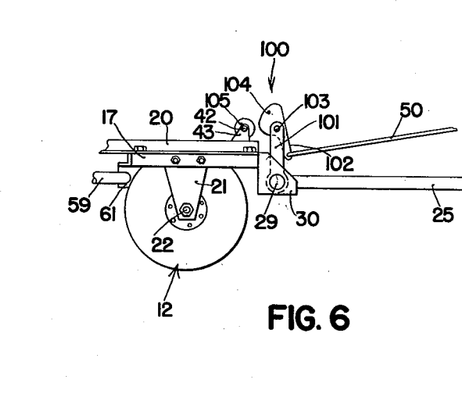
Figure 6 is a partial side elevational view of the harrow showing the front end of the frame equipped with a modified form of lifting device for angling the frame and hitch member upwardly to raise the front gang.

Figure 6 illustrates an alternative mechanism 100 which can be substituted for the block and tackle device 40 for raising the front end of the harrow frame when making a right turn and also for angularly securing the hitch device relative to the harrow frame for transport purposes. In the embodiment of Figure 6, the transverse pipe member 29 is provided with an upwardly extending arm 101 rigidly fixed thereto. A lever 102 is swingably connected by a pivot bolt 103 at the upper end of the arm 101 and the lever 102 is connected to the cable 50. The other end of the lever 102 is provided with a camming surface 104 which engages a cam following roller 105, fixed to the shaft 42 which is journaled in the brackets 43. When the cable 50 is pulled forward, the camming portion 104 is swung downwardly in contact with the roller 105, and since the radius of the cam increases as the lever swings in a counterclockwise direction, the arm 101 is urged forwardly, thereby swinging the hitch bar 25 downwardly relative to the frame of the harrow, and supporting the latter through the hitch device on the draft frame 36 of the tractor.

Referring now more particularly to Figures 7–10, inclusive, the modification shown in these figures is generally similar to the foregoing embodiment with the exception of the means for raising one end of the harrow to facilitate right turns and also the means for locking the hitch device rigidly with respect to the harrow frame for purposes of transport. In this embodiment, instead of lifting the front gang for purposes of making a right turn, the rear gang is lifted by means of a lifting device indicated in its entirety by reference numeral 110, including a lifting wheel 111 mounted on the rear transverse frame member 16 of the rear gang 13 by means providing for castering movement and also for vertical shifting movement into and out of ground engaging position. The wheel 111 is journaled on a shaft 112, which is supported in a castering fork 113, which is swingably connected to a spindle 114 by means of a transversely disposed pivot pin 115. The spindle 114 is provided with a reduced upper end 116 which projects through a suitable aperture in a bracket plate 117 fixed rigidly to the transverse frame member 16. A collar 118 is fixed to the reduced upper portion 116 above the bracket plate 117. Thus, the wheel 111 together with the fork 113 and spindle member 114 is swingable about the generally vertical axis of the spindle bearing portion 116, and has a castering action by virtue of the fact that the vertical axis of the spindle 116 is offset forwardly from the wheel axle 112. The fork 113 and wheel 111 are swingable about the transverse axis of the pivot pin 115 between a raised position indicated in Figure 9 in which the wheel 111 is above the lower portions of the disks, and a carrying position indicated in Figure 8 in which the wheel 111 is shifted downwardly until it runs on a level below the disks of the rear gang 13.

Figures 8, 9, 10:
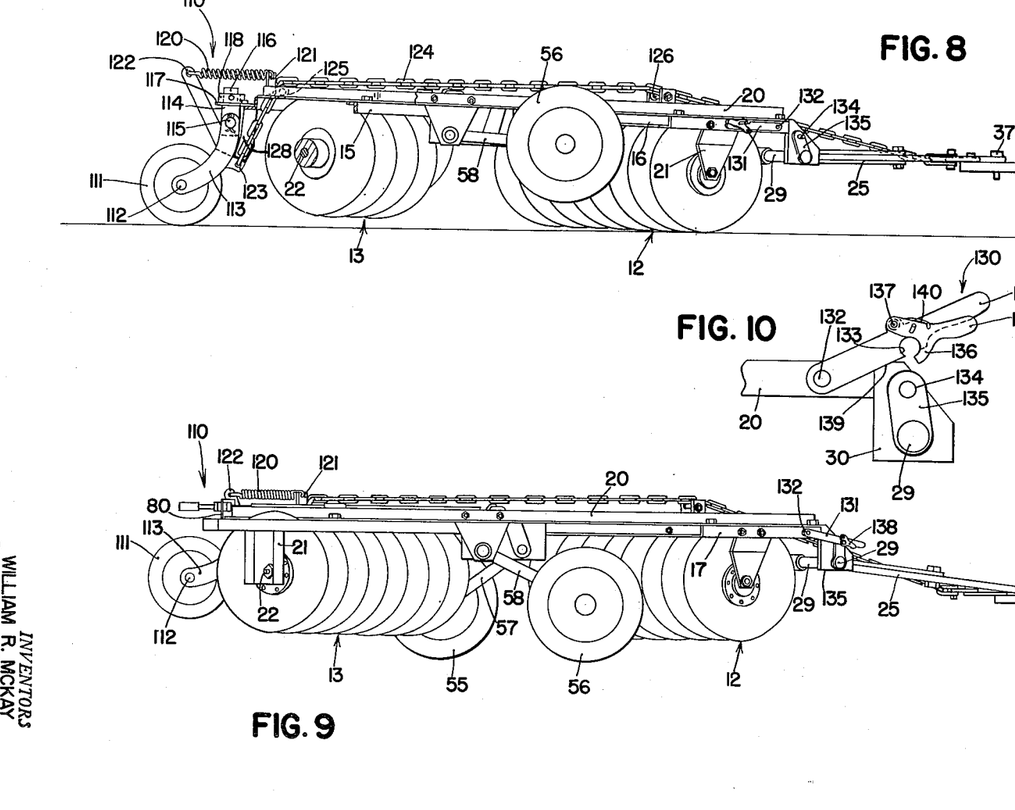
Figure 8 is a side elevational view of the harrow shown in Figure 7, shown in a position in which the rear end of the frame is raised for purposes of making a turn, a portion of the rear disk gang being broken away to more clearly show the details of the caster wheel.
Figure 9 is a side elevational view of the harrow shown in Figures 7 and 8, raised upon the transport wheels.
Figure 10 is an enlarged elevational view showing the details of a manually actuable locking device for fixing the hitch member relative to the harrow frame for purposes of transport.

Normally, the wheel is held in raised position by means of a spring 120 of the helical type, connected between a bracket 121 fixed to the rear transverse frame member 16 and extending rearwardly therefrom. The rear end of the spring 120 is connected to a lever arm 122 which is rigidly fixed to the wheel fork 113 and extends upwardly and rearwardly therefrom. The spring 120 is stressed in tension to urge the arm 122 forwardly, thereby swinging the fork 113 upwardly about the axis of the pivot pin 115. A second lever arm 123 is rigidly fixed to the front side of the fork 113 beneath the pivot pin 115 and is connected through a flexible draft member in the form of a chain 124 with the tractor draft frame 36. The chain 124 extends upwardly and forwardly from the lever arm 123 and passes over a roller 125 journaled on the front side of the transverse frame member 16 of the rear gang, and extends forwardly over the harrow frame, passing over a second roller 126 journaled on the front transverse frame member 15 of the front gang frame 14, from which it extends forwardly and inclines downwardly and is connected to the tractor draft frame 36 by a bolt 127.

When the tractor makes a right turn, the chain 124 is pulled forwardly, against the opposition of the spring 120, swinging the fork 113 downwardly and urging the wheel 111 against the ground and thereby raising the rear gang, as indicated in Figure 8. A stop 128 is provided for limiting the forward and downward movement of the wheel fork 113 and is rigidly fixed to the rear transverse frame member 16. Thus, raising the rear gang on the caster wheel 111 permits the harrow to roll on the disks of the front gang 12, thereby following the tractor around the right turn. As soon as the tractor is straightened, the tension is relieved from the chain 124, allowing the spring 120 to retract the wheel fork 113 upwardly and allowing the rear gang 13 to drop into ground engaging position.

The harrow in this embodiment is raised to transport position by turning the cranks 72, 82, lowering the transport wheels 55, 56 as explained above. In order to secure the hitch bar 25 rigidly with respect to the harrow frame to stabilize the latter for transport on the wheels 55, 56, a hand-operated locking device is provided, indicated in its entirety by reference numeral 130. The locking device 130 comprises a lever 131 pivotally mounted on the end member 17 of the front gang frame 14 by means of a pivot bolt 132. The lever 131 is provided with a notch or recess 133, which is adapted to receive a pin 134 fixed to an arm 135 which is rigidly mounted on the outer end of the transverse pipe member 29. Thus, when the pin 134 is seated firmly within the notch 133, the hitch bar 25 is held against angular movement with respect to the frame of the harrow. The locking lever 131 is retained in locked position by means of a latch dog 136 which is pivoted at 137 on the lever 131 and has a handle 138 for raising the latch dog 136.

Normally, the lever 131 is swung to a rearwardly extending position as indicated in Figure 8, permitting free vertical swinging movement of the hitch device relative to the harrow as the tractor moves along an uneven surface. When it is desired to transport the harrow, the lever 131 is swung forwardly until the lower edge 139 rests upon the pin 134. The harrow frame is then raised by turning the cranks 72, 82, and as the harrow rises, the arm 135 swings forwardly, inasmuch as the hitch bar 25 remains connected by the draft pin 37 to the tractor draft frame 36. Preferably, however, the transport wheels 55, 56 are located so that the harrow tends to tip forwardly and therefore it is necessary for the operator at the rear of the harrow to push downwardly thereupon after the harrow has been raised upon the wheels 55, 56. This has the effect of raising the front end of the harrow and the rear end of the draft device, causing the pin 34 to slide forwardly on the lower edge 139 and engage the end of the latch dog 136, pushing it forwardly out of the way until the pin 134 drops into the notch 133, after which the weight of the latch dog and handle 138 returns it to a position engaging the lower portion of the pin 134. If desired, a spring 140 may be installed to urge the latch dog toward latched position. The harrow is returned to working position by unlocking the hitch device by grasping the handle 138 of the latch dog and swinging the lever 131 upwardly and rearwardly to its inoperative position, and then lowering the frame by turning the two cranks 72, 82 until the transport wheels 55, 56 are raised.

We do not intend our invention to be limited to the exact details shown and described herein except as set forth in the claims which follow.

We claim:

1. A ground working implement comprising a rigid frame, draft means therefor, two fore and aft spaced, ground engaging tool means mounted on the front and rear portions of said frame, a caster wheel, vertically shiftable means for mounting said caster wheel adjacent one end of said frame, resilient means acting between said caster wheel and said frame for normally holding said caster wheel in raised position, and a flexible member connected to said caster wheel and adapted to be connected with a draft vehicle in offset relation to said draft means so that a turning of the draft vehicle in one direction will exert a pull on said flexible member overcoming said holding means and lowering said caster wheel, whereby said frame is supported on said caster wheel at said one end of the frame and on the tool means at the other end of said frame.

2. A disk harrow comprising a rigid frame, draft means at the forward end thereof, front and rear gangs of disks mounted on said frame and rotatable about horizontally angled axes, a caster wheel disposed at the rear end of said frame, means for mounting said wheel on said frame providing for vertical shifting movement relative thereto to raise and lower the rear end of said frame, and a flexible connection between said caster wheel and a tractor in offset relation to the draft connection thereto, for shifting said caster wheel downwardly responsive to a turning of the tractor in one direction to raise the rear disk gang off the ground to cause the harrow to roll on the caster wheel and said front disk gang during a turn.

3. A disk harrow comprising a rigid frame, front and rear gangs of disks mounted on said frame and rotatable about relatively fixed horizontal axes, a hitch member swingably attached to the forward end of said frame by means providing for vertical swinging movement relative thereto and adapted to be coupled to a tractor for horizontal swinging movement relative thereto, a flexible draft member adapted to be connected to the tractor in laterally offset relation to the connection thereto of said hitch member whereby a turning of said tractor in one direction exerts a forward pull on said flexible draft member, and lifting means attached to the forward end of said frame and connected with the rear end of said flexible member, said lifting means being responsive to a forward pull on said member to raise the front gang of disks from the ground to facilitate the turn.

4. A disk harrow comprising a rigid frame, front and rear gangs of disks mounted on said frame and rotatable about relatively fixed horizontal axes, a hitch member swingably attached to the forward end of said frame by means providing for vertical swinging movement relative thereto and adapted to be coupled to a tractor for horizontal swinging movement relative thereto, a flexible draft member adapted to be connected to the tractor in laterally offset relation to the connection thereto of said hitch member whereby a turning of said tractor in one direction exerts a forward pull on said flexible draft member, and a lifting device connected to said flexible member and acting between said frame and said hitch member to raise the front end of said frame through said hitch member and support the latter on the tractor to carry the front disk gang in raised position to facilitate turning.

5. A disk harrow comprising a rigid frame, front and rear gangs of disks mounted on said frame and rotatable about relatively fixed horizontal axes, a hitch member swingably attached to the forward end of said frame by means providing for vertical swinging movement relative thereto and adapted to be coupled to a tractor for horizontal swinging movement relative thereto, a flexible draft member adapted to be connected to the tractor in laterally offset relation to the connection thereto of said hitch member whereby a turning of said tractor in one direction exerts a forward pull on said flexible draft member, a sheave journaled on said hitch member on an axis disposed rearwardly of the axis of vertical swinging movement of said hitch member, a second sheave journaled on said frame above said first sheave, said flexible member being trained around said sheaves, and means for anchoring the end of said flexible member, whereby a forward pull on said flexible member forces said sheaves together, thereby raising the front disk gang to facilitate turning.

6. A disk harrow comprising a rigid frame, front and rear gangs of disks mounted on said frame and rotatable about relatively fixed horizontal axes, a hitch member swingably attached to the forward end of said frame by means providing for vertical swinging movement relative thereto and adapted to be coupled to a tractor for horizontal swinging movement relative thereto, a flexible draft member adapted to be connected to the tractor in laterally offset relation to the connection thereto of said hitch member whereby a turning of said tractor in one direction exerts a forward pull on said flexible draft member, an arm extending upwardly from said hitch member and swingable therewith, a lever pivotally mounted on said arm for movement about a transverse axis, said flexible member being attached to said lever, and a pair of interengaging camming surfaces on said lever and said frame, respectively, responsive to a forward pull on said flexible member to angle said frame and hitch member upwardly to support the forward end of said frame through said hitch member on the tractor.

7. A disk harrow comprising a rigid frame, front and rear gangs of disks mounted on said frame and rotatable about relatively fixed horizontal axes, a hitch member swingably attached to the forward end of said frame by means providing for vertical swinging movement relative thereto, transport wheels mounted on said frame by means providing for vertical movement to raise the harrow frame on said wheels from ground working position to transport position, and means for fixing said hitch member angularly relative to said frame for transporting on said wheels comprising a pair of sheaves journaled on said frame and said hitch member, respectively, a flexible member trained around said sheaves, and means for anchoring the rear end of said flexible member to said frame, whereby a forward pull on the forward end of said flexible member forces said sheaves together, thereby raising the front disk gang to facilitate turning.

8. A disk harrow comprising a rigid frame, front and rear gangs of disks mounted on said frame and rotatable about relatively fixed horizontal axes, a hitch member swingably attached to the forward end of said frame by means providing for vertical swinging movement relative thereto, transport wheels mounted on said frame by means providing for vertical movement to raise the harrow frame on said wheels from ground working position to transport position, and means for fixing said hitch member angularly relative to said frame for transporting on said wheels comprising an arm fixed on said hitch member, a lever pivoted on said arm for angular movement about a transverse axis, a pair of camming surfaces on said lever and said frame, respectively, and adapted to interengage to angle said frame and hitch member upwardly to form a unitary rigid structure, and means for moving said lever to force the camming surface thereon against the camming surface on said frame so as to hold said hitch member and frame rigid during transport.

9. A disk harrow comprising a rigid frame, front and rear gangs of disks mounted on said frame and rotatable about relatively fixed horizontal axes, a hitch member swingably attached to the forward end of said frame by means providing for vertical swinging movement relative thereto, transport wheels mounted on said frame by means providing for vertical movement to raise the harrow frame on said wheels from ground working position to transport position, and means for fixing said hitch member angularly relative to said frame for transporting on said wheels comprising an arm fixed on said hitch member and swingable therewith, a detent pin on said arm, a lever pivotally mounted on said frame and having a recess adapted to receive said pin, and a disengageable dog for retaining said pin within said recess, thereby holding said hitch member rigid with respect to said frame for supporting the forward end of the latter on a tractor.

10. In a disk harrow comprising fore and aft spaced front and rear gangs connected together in horizontally angled working relation and arranged to converge at one side of the harrow, said disk harrow having draft means adapted for connection to a tractor, the combination of lifting means mounted on one end of said harrow for raising only one of said gangs from ground working position while the other of said gangs rests on the ground, and a control connection for said raising means adapted to be connected to the tractor at a point offset laterally from the point of connection of said draft means, to cause one gang of said harrow to be raised out of the ground responsive to turning the tractor in a direction away from the point of convergence of said gangs, the harrow being supported during the turn on the other gang.

11. In a disk harrow comprising front and rear gangs connected together in horizontally angled working relation and arranged to converge at one side of the harrow, said disk harrow having a hitch member pivotally connected to the forward end of the harrow for generally vertical swinging relative to the harrow and adapted to be coupled to a tractor for horizontal swinging movement relative thereto, a flexible tension member adapted to be connected to the tractor in laterally offset relation to the connection thereto of said hitch member whereby a turning of the tractor in one direction exerts a forward pull on said flexible tension member, a caster wheel attached to the harrow behind said rear gang by means providing for vertical shifting movement relative thereto to raise and lower said rear gang, and means connected to said flexible tension member and responsive to a forward pull thereon for shifting said caster wheel downwardly responsive to a turning of the tractor in a direction away from the point of convergence of said gangs, to raise the rear gang off the ground to cause the harrow to roll on the front disk gang during a turn away from said point of convergence.

12. In a disk harrow comprising front and rear gangs connected together in horizontally angled working relation and having a hitch member adapted to be coupled to a tractor for horizontal swinging movement relative thereto, means pivotally connecting said hitch member to the forward end of said harrow by means providing for vertical swinging movement relative thereto, a flexible draft member adapted to be connected to the tractor in laterally offset relation to the connection thereto of said hitch member whereby a turning of the tractor in one direction exerts a forward pull on said flexible draft member, and a lifting mechanism connected between said front gang and said hitch member and connected with the rear end of said flexible member, said lifting means being operable to exert a force between said front gang and said hitch member tending to swing the latter vertically responsive to a forward pull on said flexible member to raise said front gang off the ground to facilitate turning.

13. In a disk harrow comprising a rigid frame, front and rear gangs mounted on said frame in horizontally angled relation and converging at one side of said frame, draft means pivotally mounted on said frame for generally vertical swinging movement relative thereto and adapted to be connected at its forward end to a tractor, lifting means mounted on said frame operable to raise only one of said gangs from ground working position while the other of said gangs rests upon the ground, and a motion transmitting connection for said lifting means adapted to be attached to the tractor at a point laterally offset from the point of attachment of said draft means, whereby said one gang is raised from its ground working position responsive to a turn of said tractor in a direction away from the point of convergence of said gangs, said harrow being supported on said other gang during said turn.

14. In a disk harrow comprising front and rear gangs connected together in horizontally angled working relation and having a hitch member pivotally attached at the forward end of the harrow and adapted to be coupled to a tractor for horizontal swinging movement relative thereto, means acting between said frame and said hitch member for shifting one relative to the other in a direction to lift said front gang relative to said rear gang, and means for actuating said lifting means responsive to a turning of the tractor in one direction, to raise said front gang off the ground to cause the harrow to roll on the rear gang during a turn.

WILLIAM R. McKAY.
ROLLIE H. MITCHELL.

REFERENCES CITED

The following references are of record in the file of this patent:

UNITED STATES PATENTS

| Number | Name | Date |
|---|---|---|
| 984,625 | Waterman | Feb. 21, 1911 |
| 1,011,385 | Smith | Dec. 12, 1911 |
| 1,013,382 | East | Jan. 2, 1912 |
| 1,030,282 | Clancy | June 25, 1912 |
| 1,171,705 | Cornell | Feb. 15, 1916 |
| 1,711,485 | Bergeland | May 7, 1929 |
| 1,762,633 | Johnson | June 10, 1930 |
| 2,085,633 | Cary | June 29, 1937 |
| 2,164,963 | Taylor | July 4, 1939 |
| 2,297,788 | McGehee | Oct. 6, 1942 |
| 2,337,801 | Cook | Dec. 28, 1943 |
| 2,349,257 | Evans | May 23, 1944 |
| 2,356,876 | Newkirk | Aug. 29, 1944 |
| 2,383,373 | Dewey | Aug. 21, 1945 |

FOREIGN PATENTS

| Number | Country | Date |
|---|---|---|
| 22,199 | Australia | of 1935 |
| 111,999 | Australia | Dec. 19, 1940 |